US007064308B2

(12) United States Patent
Takiguchi et al.

(10) Patent No.: US 7,064,308 B2
(45) Date of Patent: Jun. 20, 2006

(54) METHOD OF AND APPARATUS FOR ADJUSTING THE FOCUS POSITION OF AN OPTICAL PICKUP

(75) Inventors: Hitoshi Takiguchi, Saitama-ken (JP);
Hidekazu Ouchi, Saitama-ken (JP);
Yasushi Kumamaru, Saitama-ken (JP);
Naoki Yamada, Saitama-ken (JP);
Tetsuya Murakami, Saitama-ken (JP);
Yoshinari Kuwabara, Saitama-ken (JP); Ko Ishii, Saitama-ken (JP)

(73) Assignee: Pioneer Corporation, Tokyo (JP)

( * ) Notice: Subject to any disclaimer, the term of this patent is extended or adjusted under 35 U.S.C. 154(b) by 301 days.

(21) Appl. No.: 10/776,315

(22) Filed: Feb. 12, 2004

(65) Prior Publication Data

US 2004/0159770 A1 Aug. 19, 2004

(30) Foreign Application Priority Data

Feb. 18, 2003 (JP) .............................. 2003-039653

(51) Int. Cl.
*G02B 7/04* (2006.01)
(52) U.S. Cl. ................................. 250/201.2; 250/201.5
(58) Field of Classification Search ............. 250/201.2, 250/201.5, 201.4
See application file for complete search history.

(56) References Cited

U.S. PATENT DOCUMENTS 5,142,520 A * 8/1992 Yanagi et al. ............ 369/44.11
6,728,185 B1 * 4/2004 Terashi et al. ........... 369/53.28

* cited by examiner

*Primary Examiner*—Georgia Epps
*Assistant Examiner*—Tony Lu
(74) *Attorney, Agent, or Firm*—Arent Fox PLLC (57) ABSTRACT

It is an object of the present invention to adjust the focus position of an optical pickup. A brightness measuring apparatus having a half mirror and an objective lens focusing on the half mirror is disposed at a position facing an optical pickup PUi, in a manner such that the objective lens OB of the optical pickup PUi faces the half mirror. Then, the optical pickup PUi is operated to start a focus servo, while the position of multi-lens provided in the optical pickup PUi is changed continuously, thereby measuring a highest brightness of a spot light image incident on the half mirror through the objective lens, by virtue of the brightness measuring apparatus. Subsequently, a highest brightness change caused by changing the position of the multi-lens ML is inspected so as to fix the multi-lens ML at a position when the maximum highest brightness has been obtained, thereby effecting an optimum focus position adjustment for an optical pickup.

4 Claims, 9 Drawing Sheets

| FOCUSING POINT DEFLECTION AMOUNT (μm) | RF LEVEL (mV) | BP BRIGHTNESS (%) |
|---|---|---|
| 0.10 | 304.7 | 100 |
| −0.20 | 296.7 | 99 |
| 0.50 | 270.7 | 95 |
| −0.60 | 264.0 | 92 |
| 0.75 | 254.0 | 85 |
| −0.73 | 255.3 | 82 |

METHOD OF AND APPARATUS FOR ADJUSTING THE FOCUS POSITION OF AN OPTICAL PICKUP

BACKGROUND OF THE INVENTION

The present invention relates to a focus position adjusting method and a focus position adjusting apparatus for use with an optical pickup provided in an information recording/reproducing apparatus such as a DVD player.

The present application claims priority from Japanese Application No. 2003-39653, the disclosure of which is incorporated herein by reference.

Conventionally, in a process for manufacturing a DVD player, the below-discussed well-known adjustment method is generally used to adjust the focus position of an optical pickup.

Namely, if the focus position of an optical pickup is deviated from an appropriate target position, an unfavorable effect will occur due to such a deviation (offset) from the target position. As a result, it is difficult to perform information recording/reproducing (in an appropriate focusing state) on an optical disc loaded in the DVD player. For this reason, in an actual manufacturing step before product shipment, test operation of each optical pickup is performed using a reflected light from an actual optical disc, thereby adjusting the focus position of each produced optical pickup.

In test operation, each optical pickup is rendered to perform usual recording/reproducing using an adjustment apparatus in which an optical disc has been loaded. In detail, a light beam is caused to irradiate the optical disc through an objective lens provided within the optical pickup, while a reflected light from the optical disc forms an incident light through the same objective lens.

Actually, an optical pickup contains not only an objective lens, but also a plurality of symmetrically divided light-receiving surfaces. In this way, it is possible to receive a reflected light transmitting through the objective lens on these divided light-receiving surfaces. An optical pickup further contains a light-receiving element for outputting photo-electric-conversion signal for generating RF signal or focus error signal, as well as a multi-lens located between the objective lens and the light-receiving element for correcting the focus of a reflected light with respect to the light-receiving element.

If the focus position of the reflected light in its optical axis direction is deviated from an appropriate target position, the focus position of the objective lens of the optical pickup will become inappropriate. In view of this, the multi-lens for correcting the focus of the reflected light is provided between the objective lens and the light-receiving element.

Here, in order to correct the focus of the reflected light transmitting through the objective lens, the position of the multi-lens in the direction of the optical axis is adjusted so that the reflected light is incident on the light-receiving surface arranged on the light-receiving element. Afterwards, the obtained photo-electric-conversion signal is used to adjust the focus position of the optical pickup to an appropriate target position.

However, in the above-described conventional focus position adjusting method, since an optical disc is loaded in each adjustment apparatus and the focus position of an optical pickup is adjusted in accordance with reproduced information signals, there has occurred a problem that adjustment result is likely to be affected by an optical disc manufacturing irregularity or the like.

Moreover, since an optical disc is apt to suffer from a distortion or warp, even if only one optical disc is used in the focus position adjustment, such an adjustment is likely to be carried out based on photo-electric-conversion signals affected by disc distortion, hence making it difficult to perform highly accurate focus position adjustment.

In addition, since optical discs have to be actually loaded into great number of adjustment apparatuses, an operation for adjusting the focus position of optical pickup will become too complicated and troublesome.

SUMMARY OF THE INVENTION

The present invention has been accomplished in view of the above-discussed problem, and it is an object of the invention to provide an improved method and apparatus for properly adjusting the focus position of an optical pickup.

In one aspect of the present invention, there is provided a method of adjusting the focus position of an optical pickup, the method comprising: a first step in which a brightness measuring apparatus including a half mirror and an objective lens focusing on the half mirror and also including a signal processor for finding a highest brightness of a light image entering through the half mirror and the objective lens is disposed to face an optical pickup; and a second step in which the optical pickup is operated to start a focus servo, the positions of semiconductor lasers provided in the optical pickup or relative positions of a multi-lens and a light-receiving element of the optical pickup are changed continuously, the signal processor is operated to find a change in the highest brightness of a spot light image incident on the half mirror through an objective lens provided in the optical pickup, the positions are fixed once the semiconductor lasers or the multi-lens and light-receiving element have been moved to positions when the highest brightness has become a maximum highest brightness, thereby effecting an adjustment of the focus position of the optical pickup.

In another aspect of the present invention, there is provided an apparatus for adjusting the focus position of an optical pickup, the apparatus comprising: a brightness measuring apparatus including a half mirror and an objective lens focusing on the half mirror and also including a signal processor for finding a highest brightness of a light image entering through the half mirror and the objective lens. Specifically, the optical pickup is operated to start a focus servo, the positions of semiconductor lasers provided in the optical pickup or relative positions of a multi-lens and a light-receiving element of-the optical pickup are changed continuously, the signal processor is operated to find a change in the highest brightness of a spot light image incident on the half mirror through an objective lens provided in the optical pickup. In particular, the positions are fixed once the semiconductor lasers or the multi-lens and light-receiving element have been moved to positions when the highest brightness has become a maximum highest brightness, thereby effecting an adjustment of the focus position of the optical pickup.

BRIEF DESCRIPTION OF THE DRAWINGS

These and other objects and advantages of the present invention will become clear from the following description with reference to the accompanying drawings, wherein.

DETAILED DESCRIPTION OF THE PREFERRED EMBODIMENTS

One embodiment of the present invention will be described in the following with reference to FIG. 1 which provides explanatory views schematically showing a method for adjusting the focus position of an optical pickup.

Figure 1:
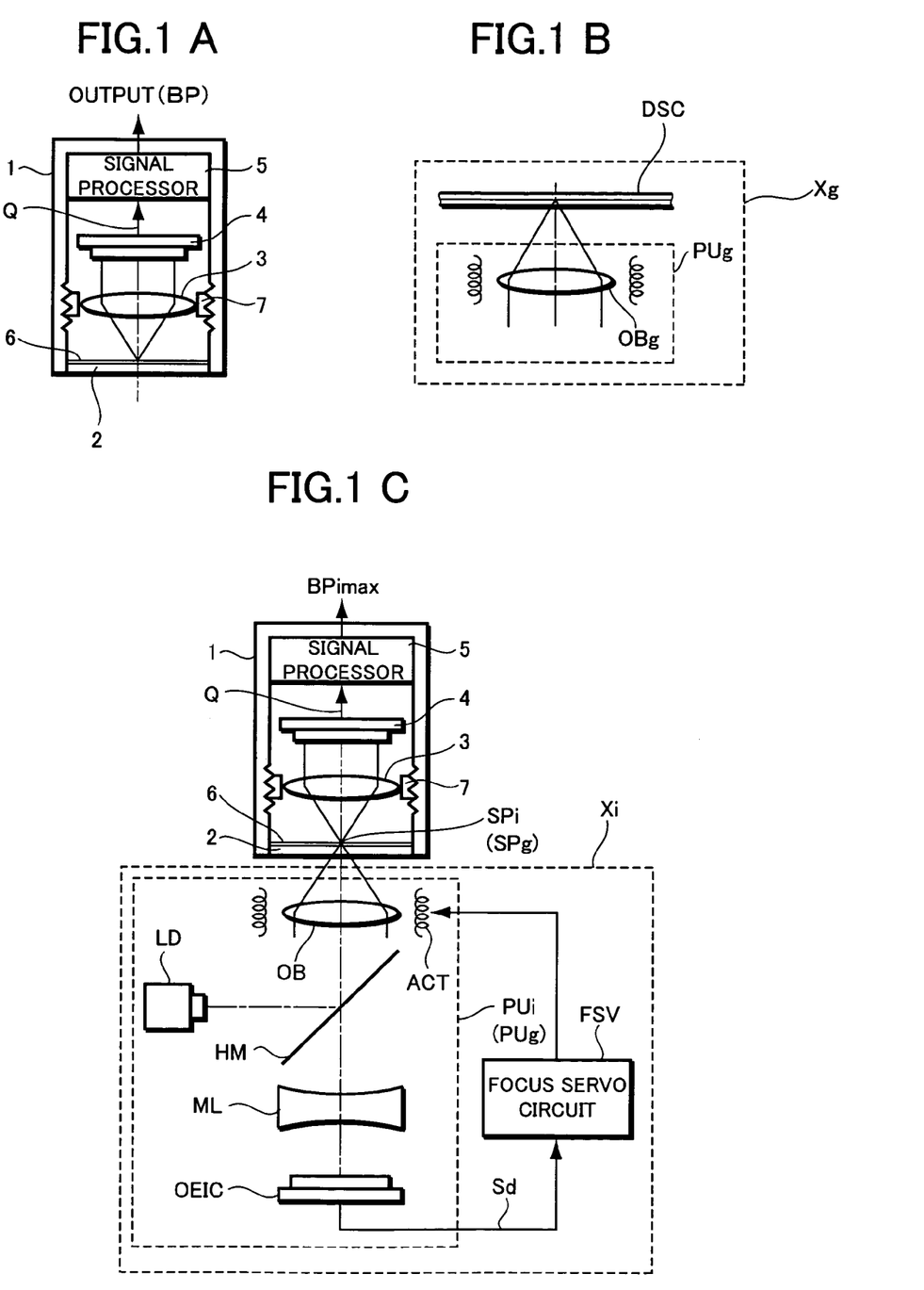
FIGS. 1A–1C are explanatory views schematically showing an optical pickup focus position adjusting method according to the present invention.

As shown in FIG. 1, a brightness measuring apparatus 1 for measuring the brightness of a spot light image is employed when adjusting the focus position of an optical pickup.

As shown in FIG. 1A, the brightness measuring apparatus 1 is provided with a semitransparent half mirror 2 located on the apparatus's incident side which receives an entering light image. Behind the half mirror 2 are provided an objective lens 3, two-dimensional image pickup element 4 such as CCD (Charge Coupled Device), and a signal processor 5 for processing output signals from the two-dimensional image pickup element 4 so as to detect and output a highest brightness BP of a light image. In fact, the half mirror 2, the objective lens 3, and the two-dimensional image pickup element 4 are provided all along an optical axis of the apparatus.

Here, the half mirror 2 is formed by vapor depositing a semitransparent film 6 consisting of a dielectric material or the like on the inner surface of a transparent glass plate provided on the incident side of the brightness measuring apparatus 1, while the objective lens 3 is fixed inside the apparatus by means of a focus adjusting jig 7.

In carrying out the focus position adjusting method of the present invention, at first, the focus adjusting jig 7 is adjusted to perform a pretreatment such that the objective lens 3 provided in the brightness measuring apparatus 1 can focus on the semitransparent film 6 of the half mirror 2.

In the pretreatment, as shown in FIG. 1B, one specific optical pickup serving as an adjustment object and adjusted in a conventional adjustment method is used as a standard optical pickup PUg.

Next, as shown in FIG. 1C, the standard optical pickup PUg is set at a position facing the half mirror 2 of the brightness measuring apparatus 1. Then, a focus servo is performed to render the standard optical pickup PUg to focus on the semitransparent film 6 of the half mirror 2. Here, the standard optical pickup PUg is in a focus servo state by virtue of an optical pickup driving jig Xi.

Subsequently, the brightness measuring apparatus 1 is operated to measure a spot light image SPg of a light beam image-formed on the semitransparent film 6, while the focus adjusting jig 7 is operated to cause the objective lens 3 to move back and forth with respect to the half mirror 2, so as to fix the objective lens 3 at a position when a maximum brightness BPmax (which is among several highest brightnesses BP obtainable when the objective lens is moved) has been obtained, thereby completing the pretreatment. However, at this time it is also possible to move the half mirror 2 back and forth with respect to the objective lens 3, so as to fix the half mirror 2 at a position when the maximum brightness BPmax (which is among several highest brightnesses BP obtainable when the half mirror is moved) has been obtained.

In this way, once the pretreatment is performed, the semitransparent film 6 of the half mirror 2 will act as if it is the recording layer of an optical disc. Thus, as shown in FIG. 1C, it is possible to render the objective lens 3 of the brightness measuring apparatus 1 to focus on the spot light image SPg of a light beam emitted from the standard optical pickup PUg focusing on the semitransparent film 6. Therefore, it is possible to set in advance the objective lens 3 of the brightness measuring apparatus 1 at an optimum focusing state coincident with the focus position of the standard optical pickup PUg.

After the pretreatment is completed, the brightness measuring apparatus 1 is used to adjust the focus position of an optical pickup PUi before product shipment, as shown in FIG. 1C.

Namely, the brightness measuring apparatus 1 adjusted in the above pretreatment is disposed to face the optical pickup PUi, rendering itself to face an objective lens OB of the optical pickup PUi.

Then, the optical pickup PUi is used to perform test operation which is the same as usual recording or reproducing operation, allowing a laser light emitted from a semiconductor laser (hereinafter referred to as laser light source) to irradiate the half mirror 2 through the objective lens OB.

In detail, the optical pickup PUi comprises a laser light source LD for producing a laser light for recording or reproducing information, and a half mirror HM for supplying a laser light emitted from the laser light source LD to the objective lens OB and for supplying a reflected light (which can also be referred to as returning light) returning back from the objective lens OB to a light-receiving element OEIC through a focus compensation multi-lens ML.

For example, as shown in FIG. 1C, the optical pickup PUi is constructed such that the laser light from the laser light source LD is reflected by the half mirror HM towards the objective lens OB, while the reflected light returning back from the objective lens OB is allowed to transmit through the half mirror HM so as to be supplied to the light-receiving element OEIC through the multi-lens ML. Alternatively, although not shown, the optical pickup PUi may also be constructed such that the laser light source LD, the multi-lens ML, and the light-receiving element OEIC are shifted in their positions with respect to the half mirror HM. Namely, the laser light from the laser light source LD is allowed to transmit through the half mirror HM so as to be supplied to the objective lens OB; while the reflected light returning back from the objective lens OB is allowed to transmit through the half mirror HM so as to be supplied to the light-receiving element OEIC through the multi-lens ML.

Here, the light-receiving element OEIC has a plurality of point-symmetrically arranged light-receiving surfaces. Using these light-receiving surfaces to receive the reflected light transmitting through the multi-lens ML, it is possible to produce photo-electric-conversion signal Sd for generating RF signal and focus error signal or the like.

Moreover, since the multi-lens ML has a structure formed by combining a cylindrical lens with a concave lens, it is possible to adjust the focus of the reflected light and perform focus control with respect to the light receiving surfaces of the light-receiving element OEIC, by adjusting an interval between the multi-lens ML and the light-receiving element OEIC.

Besides, jig Xi is provided with a focus-servo circuit FSV which finely adjusts the position of the objective lens OB based on the photo-electric-conversion signal Sd outputted from the light-receiving element OEIC, while the optical pickup PUi is provided with a focus actuator ACT.

Here, the optical pickup PUi is in focus servo state by virtue of the focus-servo circuit FSV.

While in focus servo state, the brightness measuring apparatus 1 is operated to measure several highest brightnesses BPi of spot light image SPi incident on the half mirror 2. Meanwhile, the multi-lens ML is moved appropriately back and forth in the optical axis direction, so as to fix the multi-lens ML at a position when a maximum brightness BPmax (which is among several obtained highest brightnesses Bpi) has been obtained, thereby completing the adjustment of the focus position of the optical pickup PUi.

Namely, when in focus servo state, once the multi-lens ML is moved appropriately back and forth in the optical axis direction and the reflected light is incident on the light-receiving element OEIC, the position of the objective lens OB in its optical axis direction is adjusted such that a focus error becomes zero corresponding to the photo-electric-conversion signal Sd generated by the reflected light.

However, when the multi-lens ML is moved appropriately back and forth in the optical axis direction and when the objective lens OB is adjusted to its focusing state in response to a photo-electric-conversion signal Sd generated when the reflected light (whose focus has been appropriated adjusted with respect to the light-receiving element) is incident on the light-receiving element OEIC, the brightness measuring apparatus 1 will operate to measure a maximum brightness BPimax which is higher than each highest brightness BPi obtained when the objective lens OB has been adjusted to its focusing state in response to a photo-electric-conversion signal Sd generated by a reflected light whose focus has not been appropriated adjusted with respect to the light-receiving element.

Once the maximum brightness BPimax is obtained, the focus position of the optical pickup PUi is adjusted to its optimum state by fixing the multi-lens ML.

In other words, while in focus-servo state, when the multi-lens ML is moved appropriately back and forth in the optical axis direction and if the objective lens OB has only been adjusted to its focusing state in response to the photo-electric-conversion signal Sd generated by a reflected light whose focus has not been appropriately adjusted with respect to the light-receiving element, highest brightness BPi to be measured by the brightness measuring apparatus 1 will change at low levels, making it difficult for the optical pickup PUi to reach its optimum focus position. For this reason, while in focus-servo state, the multi-lens ML is moved appropriately back and forth in the optical axis direction until the maximum brightness BPimax and a highest brightness BPi (lower than the maximum brightness BPimax) are obtained. Subsequently, the multi-lens ML is fixed at a position when the maximum brightness BPimax has been obtained, thereby adjusting the optical pickup PUi to an appropriate focus position.

Then, the brightness measuring apparatus 1 adjusted in the above pretreatment is used to adjust the focus positions of other optical pickups PUi.

In this way, according to the focus position adjusting method of the present embodiment, since the objective lens 3 provided in the brightness measuring apparatus 1 is allowed to focus on the semitransparent film 6 of the half mirror 2 to satisfy the standard optical pickup PUg, it is possible to set the objective lens 3 of the brightness measuring apparatus 1 at an optimum focusing state.

Furthermore, each optical pickup PUi (which is to be adjusted) is set at a position facing the half mirror 2 of the brightness measuring apparatus 1 (which has been adjusted to its optimum focusing state), the focus servo is started and the optical pickup PUi is allowed to focus on the semitransparent film 6 of the half mirror 2. Further, the position of the multi-lens ML of the optical pickup PUi is adjusted such that the maximum brightness BPimax may be measured by the brightness measuring apparatus 1. In this way, since such an improved new adjustment method has been established to adjust the focus position of each optical pickup PUi, it is possible to have the focus position of the optical pickup PUi to be coincident with that of the standard optical pickup PUg.

Moreover, when the multi-lens ML is appropriately moved back and forth, since the brightness measuring apparatus 1 is operative to measure the maximum brightness BPimax, it is possible to quickly find an optimum position for the multi-lens ML without having to perform complex adjustment. In this way, it is possible to quickly adjust the focus position of an optical pickup PUi and make it possible to perform a simplified speedy adjustment.

Besides, since the brightness measuring apparatus 1 set at its optimum focusing state is used to adjust the focus position of an optical pickup PUi, it is possible to highly precisely adjust the focus position of each optical pickup PUi, without having to suffer any unfavorable effect possibly caused due to manufacturing irregularity or distortion (such as in the above-discussed prior art where an optical disc is loaded).

Furthermore, since the brightness measuring apparatus 1 set at an optimum focusing state is used to adjust the focus position of each optical pickup PUi, it is possible to manufacture all the optical pickups PUi with an acceptable uniformity.

Moreover, it is also possible to realize an automated focus position adjustment for each optical pickup PUi being conveyed towards the brightness measuring apparatus 1, simply by disposing the brightness measuring apparatus 1 adjusted in the above pretreatment on a manufacturing line and automatically positioning the half mirror 2 of the brightness measuring apparatus 1.

DETAILED EMBODIMENT

A detailed embodiment of the present invention will be described with reference to FIGS. 2–9. However, the following description will be given to explain a method of adjusting the focus position of an optical pickup PUi which is for use in recording or reproducing information on CD (Compact Disc) or DVD (Digital Versatile Disc).

Figure 2:
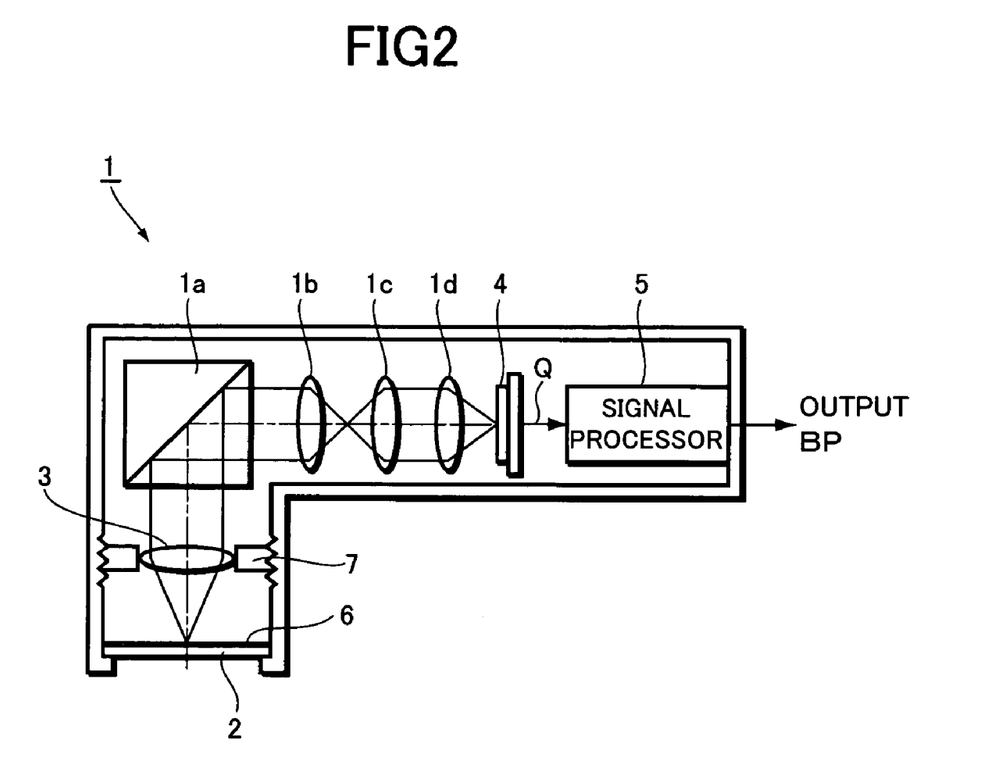
FIG. 2 is a cross sectional view showing the constitution of a brightness measuring apparatus used in the present invention.
Figure 3:
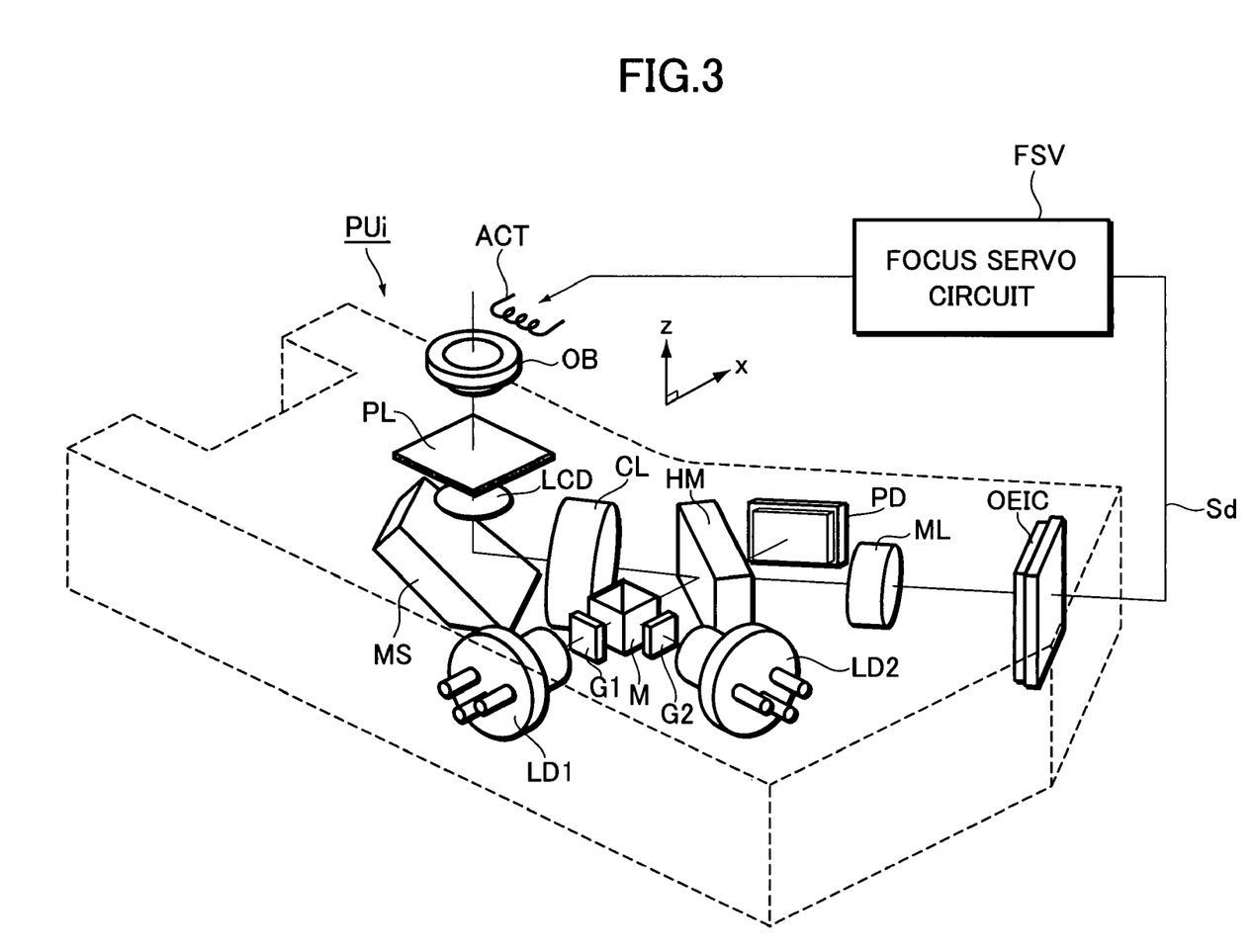
FIG. 3 is a perspective view showing the constitution of an important portion of an optical pickup used in the present invention.
Figure 4:
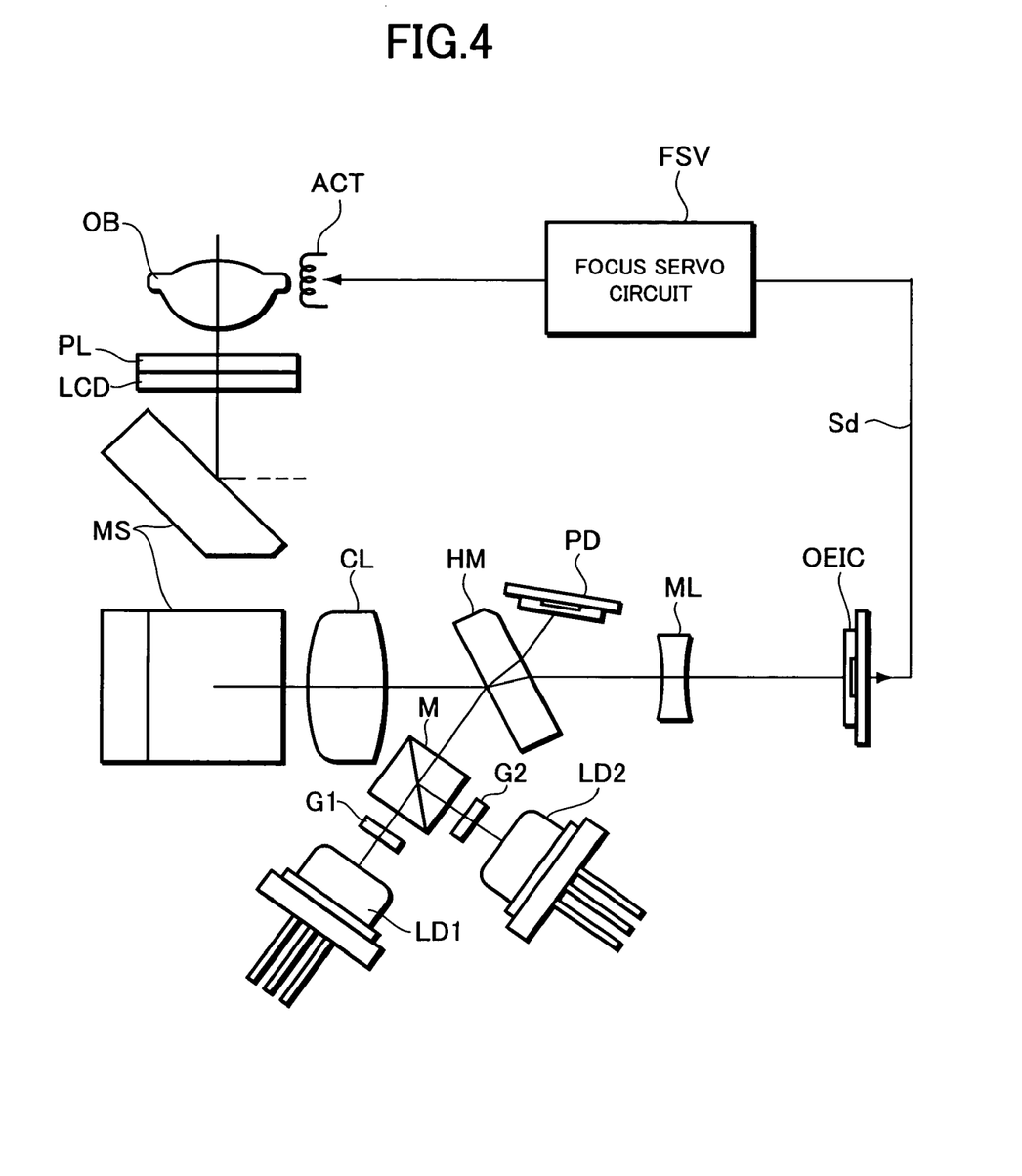
FIG. 4 is an explanatory view geometrically optically showing the constitution of the important portion of the optical pickup shown in FIG. 3.
Figure 5:
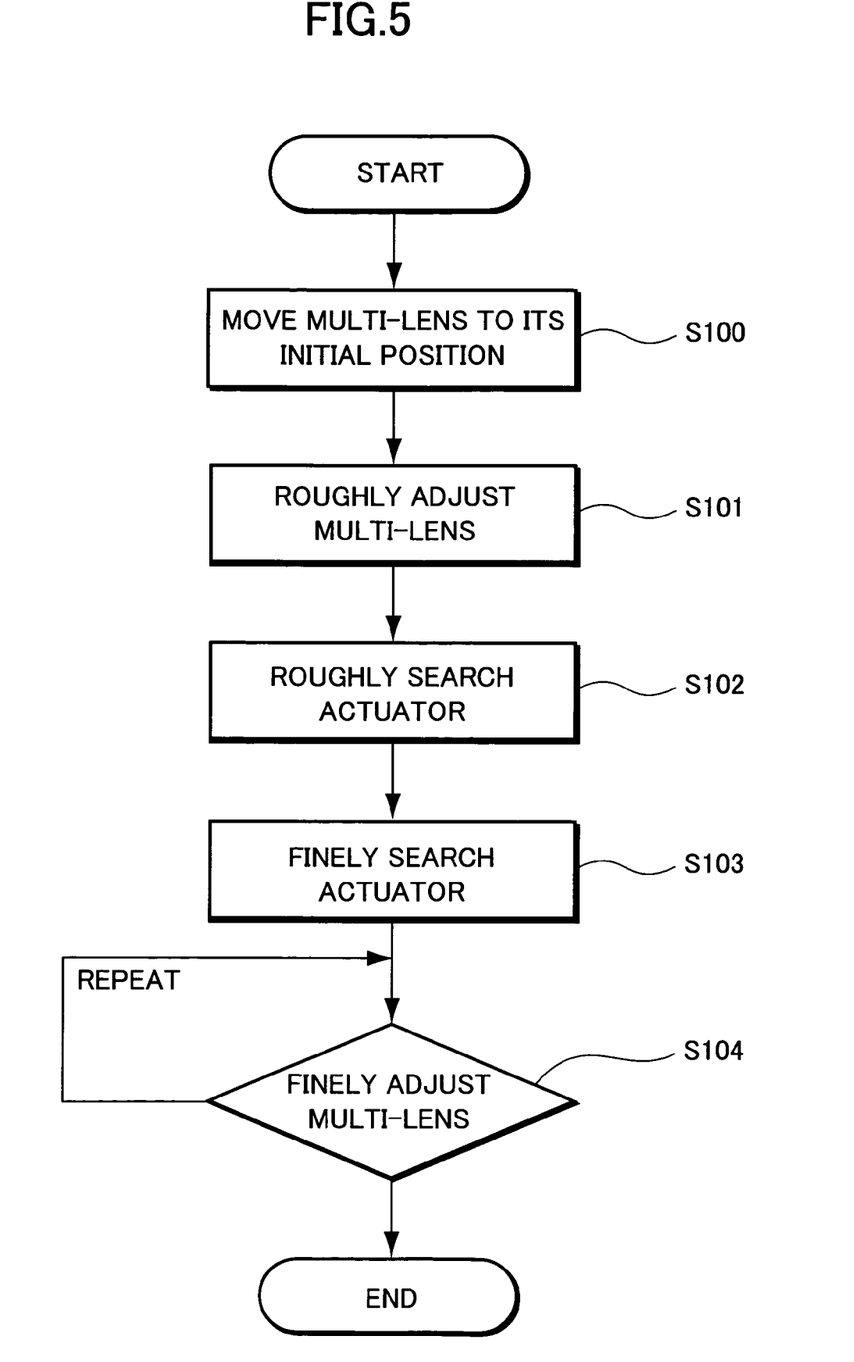
FIG. 5 is a flow chart showing a process for the focus position adjustment according to the present invention.
Figure 6:
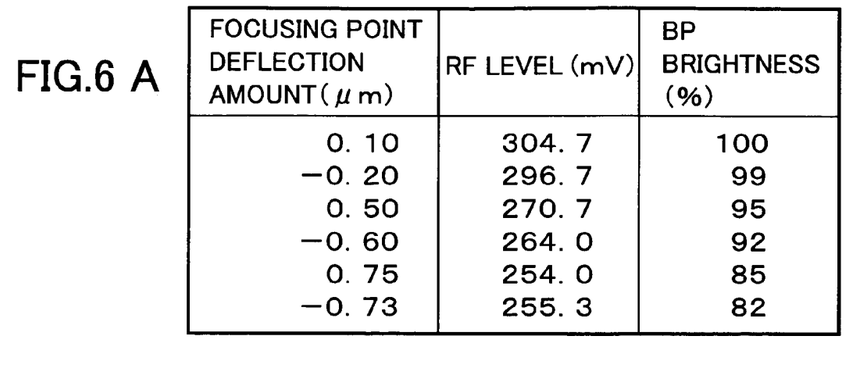
FIGS. 6A–6C provide a table and two graphs showing experiment results proving an effectiveness of the focus position adjusting method according to the present invention.
Figure 7:
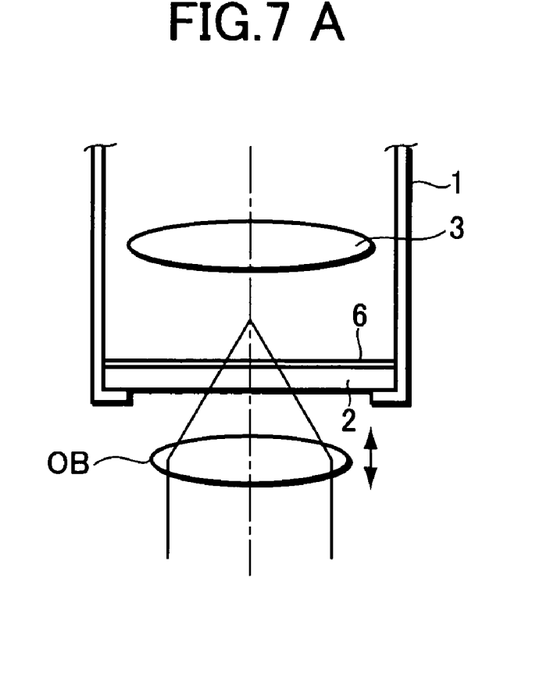
FIGS. 7A and 7B are explanatory views showing an experiment result proving an effectiveness of the focus position adjusting method according to the present invention.
Figure 8:
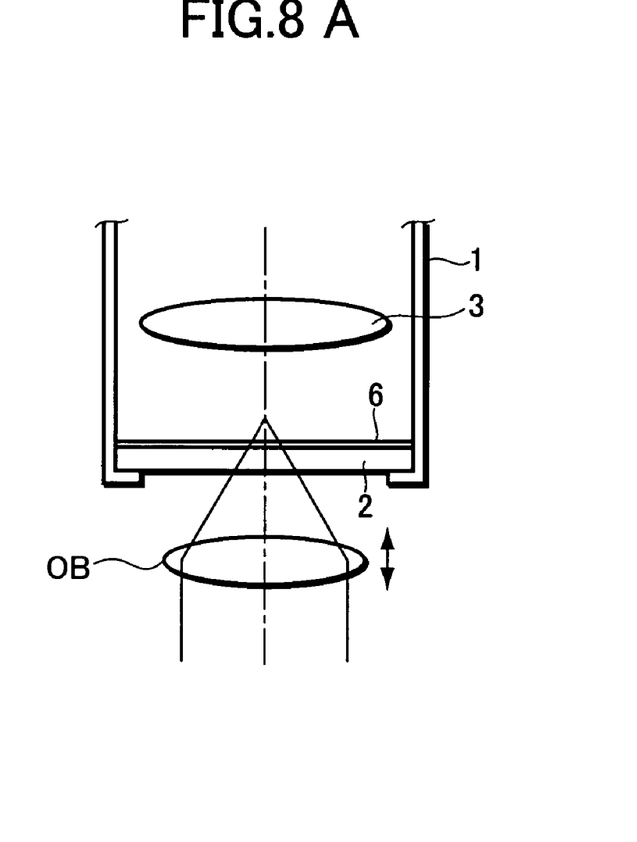
FIGS. 8A and 8B are explanatory views showing an experiment result proving an effectiveness of the focus position adjusting method according to the present invention.
Figure 9:
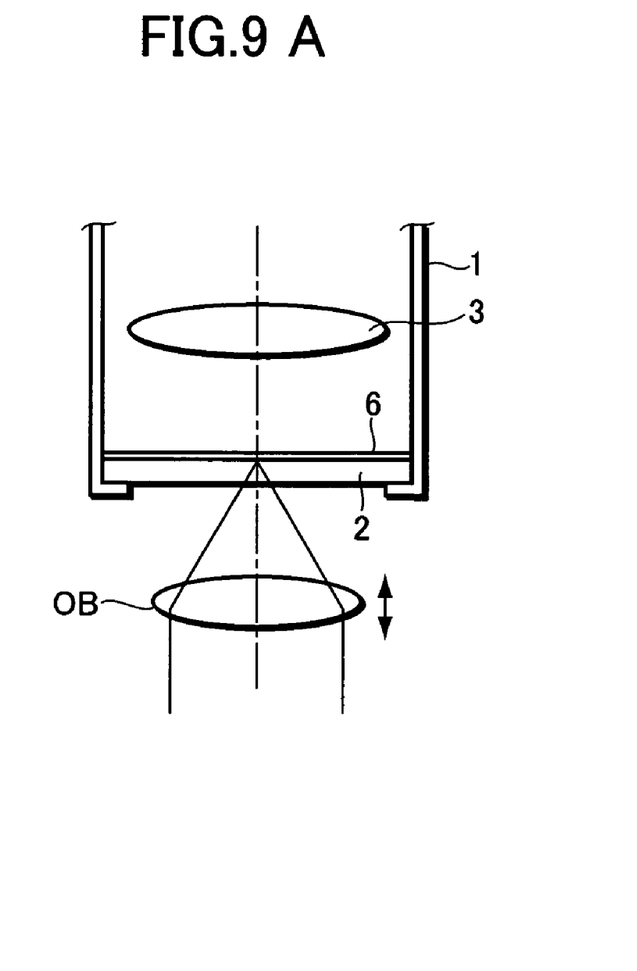
FIGS. 9A and 9B are explanatory views showing an experiment result proving an effectiveness of the focus position adjusting method according to the present invention.

FIG. 2 is an explanatory view showing the constitution of the brightness measuring apparatus 1. FIG. 3 is a perspective view showing an important portion of an optical pickup PUi. FIG. 4 is an explanatory view geometrically optically showing an important portion of an optical pickup. FIG. 5 is a flow chart showing a process for adjusting focus position. FIGS. 6–9 provide a table, graphs and explanatory views showing experiment results proving the advantages of the focus position adjusting method of the present embodiment.

However, in FIGS. 2–4 and FIGS. 7–9, elements which are identical with or corresponding to those in FIG. 1 will be represented by the same reference numerals.

At first, the constitution of the brightness measuring apparatus 1 will be described with reference to FIG. 2.

As shown in FIG. 2, the half mirror 2 is formed on an incident side of the brightness measuring apparatus 1 by vapor depositing a semitransparent film 6 such as a dielectric thin film on the inner surface of a transparent glass plate which does not deform and has a thickness of 0.6 mm.

Behind the half mirror 2 (i.e. behind the semitransparent film 6) are provided an objective lens 3, a reflection mirror 1a, three converging lenses 1b, 1c, and 1d, a two-dimensional image pickup element 4 formed by CCD (Charge Coupled Device), and a signal processor 5 for detecting a highest brightness BP of a light image by processing an output signal Q of the two-dimensional image pickup element 4, all on and along the optical axis of the apparatus 1.

Specifically, the semitransparent film 6 is formed such that its transmittance and reflectance have almost the same value, while the objective lens 3 is attached to the focus adjusting jig 7.

Next, an important portion of an optical pickup PUi will be described with reference to FIGS. 3 and 4.

As shown, an optical pickup PUi comprises a first semiconductor laser LD1 for emitting a laser beam of a wavelength of 660 nm for recording or reproducing information on DVD, a second semiconductor laser LD2 for emitting a laser beam of a wavelength of 780 nm for recording or reproducing information on CD, a first diffraction grating G1 for dispersing the laser beam emitted from the first semiconductor laser LD1, a second diffraction grating G2 for dispersing the laser beam emitted from the second semiconductor laser LD2, and a synthesizing prism M such as a dichroic mirror for emitting the laser beams transmitting through the diffraction gratings G1 and G2 in the same direction.

Furthermore, ahead of the synthesizing prism M is provided a half mirror HM for reflecting part of the laser beam from the synthesizing prism M and for passing another part of the same laser beam, further for transmitting a reflected light from the objective lens OB to the multi-lens ML.

Behind the half mirror HM are provided a light-receiving element PD which detects individually an outgoing radiation power of each of the semiconductor lasers LD1 and D2 by receiving part of their laser beams, the above-mentioned multi-lens ML, a light-receiving element OEIC having a plurality of light-receiving faces for receiving a reflected light transmitting through the multi-lens ML and thus outputting photo-electric-conversion signal Sd for generating RF signal and focus error signal.

Further, ahead of the half mirror HM are provided a collimator lens LC, a reflection mirror MS, a liquid crystal device LCD for correcting a coma aberration, ¼ wavelength plate PL, and an objective lens OB facing CD and DVD loaded in clamping positions.

Moreover, there is provided a focus actuator ACT for operating to have the objective lens OB in a focusing state.

In the above-described constitution, once the above laser light reflected by the half mirror HM is incident on the collimator lens CL, the laser light will be formed into a collimated laser beam so as to be incident on the reflection mirror MS. Then, the laser beam is reflected in z-direction (clamping direction) orthogonal to x-direction, transmitting through the liquid crystal device LCD, thus effecting a conversion from a linear polarization into a circular polarization by the ¼ wavelength plate PL. Afterwards, the laser beam is converged by the objective lens OB into an extremely thin beam so as to irradiate CD or DVD.

When a reflected light generated by irradiating the recording surface of CD or DVD with the light beam is incident on the objective lens OB, the reflected light will transmit through the objective lens OB and is converted from circular polarization into linear polarization by the ¼ wavelength plate PL. Then, the light transmits through the liquid crystal device LCD and the reflection mirror MS and is converged by the collimator lens CL into collimated beam. Subsequently, the collimated beam transmits through the half mirror HM and the multi-lens ML so as to be incident on several incident surfaces of the light-receiving element OEIC.

Next, the focus position adjustment process of the present embodiment will be described with reference to FIG. 5.

At first, the same pretreatment as described with reference to FIG. 1B and FIG. 1C is conducted. Then, the focus position adjustment is carried out in accordance with a flow chart shown in FIG. 5.

Then, in the same manner as described with reference to FIG. 1C, the brightness measuring apparatus 1 pretreated above is disposed to face an optical pickup PUi acting as an adjustment object, with the half mirror 2 of the brightness measuring apparatus 1 facing the objective lens OB of the optical pickup PUi, followed by actuating both the optical pickup PUi and the brightness measuring apparatus 1, thereby starting the focus position adjustment in accordance with the flow chart shown in FIG. 5.

At first, in step S100, the multi-lens ML provided in the optical pickup PUi acting as an adjustment object is moved to an initial position.

Next, in step S101, a rough adjustment of the multi-lens ML is carried out.

In more detail, the multi-lens ML is moved at a comparatively rough pitch, while the brightness measuring apparatus 1 is operated to measure the spot light image SPi depending upon a laser light of a constant power emitted from the first semiconductor laser LD1 and formed on the semitransparent film 6 of the half mirror 2. Subsequently, the multi-lens ML is set at a position when a highest brightness BPi becomes maximum during a rough adjustment of the multi-lens ML.

In this way, by performing a rough adjustment of the multi-lens ML, it is possible to measure the spot light image SPi using the brightness measuring apparatus 1.

Next, in step S102 serving as an "actuator rough search", a rough defocusing is performed by a focus servo circuit FSV, thereby adjusting the objective lens OB to a focusing state where a highest brightness BPi has become maximum. Therefore, the objective lens OB is allowed to focus on the semitransparent film 6 of the half mirror 2.

Next, in step S103 serving as an "actuator fine search", a fine defocusing is performed with a focusing state set in step S103 being a standard state, thereby adjusting the objective lens OB to a focusing state where a highest brightness BPi (larger than a highest brightness BPi obtained in step S102) has been obtained. Therefore, the objective lens OB is allowed to focus on the semitransparent film 6 of the half mirror 2. Moreover, a further larger brightness BPi obtained in step S103 is determined to be a maximum highest brightness BPimax.

Next, in step S104, when the focus servo is in operation, another operation rendering the multi-lens ML to appropriately move back and forth (with defocus being zero) is repeated. Then, the multi-lens ML is moved to and fixed at the position ensuring a highest brightness BPi which is closest to the maximum brightness BPimax obtained at step S103, thereby completing the focus position adjustment of the optical pickup Pui.

Then, remaining optical pickups PUi (to be adjusted) are treated in steps S100–S104 using the brightness measuring apparatus 1 pretreated in advance.

In this way, once the focus position adjustment of the present embodiment is carried out, it is possible to highly accurately adjust the focus position of each optical pickup PUi.

Next, an advantage of the focus position adjusting method of the present embodiment will be explained with reference to FIGS. 6–9.

FIG. 6A is a table in which a focusing point position (namely, an ideal position) when the focus position of an optical pickup PUi has been adjusted is assumed to be deflection "zero". The table also shows changes in amplitude level of RF signal (hereinafter referred to as "RF level") obtained when the multi-lens ML is deflected from an ideal position. In the table shown in FIG. 6A, a highest brightness measured by the brightness measuring apparatus 1 when the multi-lens ML is located at the ideal position is assumed to be 100% ideal brightness, while a percentage ratio of highest brightness (measured by the brightness measuring apparatus 1 when the multi-lens ML is deflected) to ideal brightness, i.e., (highest brightness BPi/ideal brightness)×100 is defined as "BP brightness".

As a typical example, if a deflection amount of focusing point in FIG. 6A is set at 0.10 micrometers, RF level will be 304.7 mV and BP brightness will be 100%. Then, if a deflection amount of focusing point is set at −0.20 micrometers, RF level will be 296.7 mV and BP brightness will be 99%.

FIG. 6B is a graph representing a relationship between BP brightness and RF level shown in FIG. 6A.

FIG. 6C is a graph representing a relationship between deflection amount and BP brightness shown in FIG. 6A.

As can be understood in FIGS. 6A–6C, when an absolute value of a deflection amount of focusing point is increased, BP brightness will decrease and thus RF level becomes low. Accordingly, there is a correlation among deflection amount, RF level, and BP brightness. Thus, in order to obtain an appropriate RF signal, an effective method is to adjust the multi-lens ML to an appropriate position, reduce an absolute value of a deflection amount of focusing point so as to increase BP brightness.

The focus position adjusting method of the present embodiment can be carried out in the following procedure. At first, in the above-described pretreatment, brightness measuring apparatus 1 is adjusted to a state capable of measuring an ideal brightness. Then, in step S103 and step S104, the multi-lens ML is fixed to a position of maximum brightness BPimax obtainable when changing a deflection amount of the multi-lens ML, thereby effecting the focus position adjustment in accordance with the correlation among deflection amount, RF level, and BP brightness. In this way, it is possible to adjust the focus position of each optical pickup PUi with an extremely high accuracy.

Moreover, as schematically shown in FIG. 7A, before the position of the multi-lens ML is adjusted, since the focus position of an optical pickup PUi has not been adjusted, if the objective lens OB is not focusing on the semitransparent film 6 of the half mirror 2 of the brightness measuring apparatus 1, even though a focus servo is performed on the objective lens OB, it is still impossible for a spot light image having a high brightness to be formed on the semitransparent film 6, as shown in FIG. 7B which is a copy of a photograph of the situation.

Different from the situation shown in FIG. 7A, as schematically shown in FIG. 8A, if the position of the multi-lens ML is adjusted with the objective lens OB in focus servo state, the objective lens OB will receive a driving force from the focus actuator ACT so as to start moving back and forth slightly, thereby gradually adjusting the focus position of the optical pickup PUi. In this way, during the process of adjusting the position of the multi-lens ML, the objective lens OB becomes focusing and non-focusing on the semitransparent film 6 of the half mirror 2, thus forming a transition state shown in FIG. 8B (a copy of a photograph) in which a spot light image having a high brightness gradually appears on the semitransparent film 6.

Then, as schematically shown in FIG. 9A, if the position of the multi-lens ML is continued to be adjusted with the objective lens OB in focus servo state, the objective lens OB will focus exactly on the semitransparent film 6 of the half mirror 2. Consequently, as shown in FIG. 9B (a copy of a photograph), a spot light image having a high brightness (BP brightness is 100%) is formed on the semitransparent film 6. Then, once the multi-lens ML is fixed at a position when BP brightness has become 100%, it is possible to appropriately adjust the focus position of optical pickup PUi. Further, after the focus position of the optical pickup PUi has been adjusted, the optical pickup is set in an inspection apparatus loaded with an optical disc and the focus-servo circuit FSV is operated to perform focus servo on the objective lens OB. At this time, it is possible to reproduce RF signal having an optimum level (having the least jitter) when the objective lens OB is focusing.

That is, if the multi-lens ML is fixed at a position when a spot light image with a high brightness (BP brightness is 100%) has formed on the semitransparent film 6, it is possible to appropriately adjust the focus position of an optical pickup PUi. Then, if the optical pickup PUi (with its focus position adjusted) is set in an inspection apparatus loaded with an optical disc and the focus servo circuit FSV is operated to make the objective lens OB to focus on the optical disc, it is allowed to obtain the same characteristic as shown in FIG. 6C in which the horizontal axis represents focus error and the vertical axis represents the amplitude level of RF signal. Namely, as shown in FIG. 6C, when a focus error is zero (as shown in the center of the horizontal axis), the amplitude level of RF signal will become maximum. Then, when the focus error increases in the plus and minus directions, the amplitude level of RF signal will gradually decrease, thereby obtaining an extremely ideal focus servo characteristic.

Therefore, an advantage of the method according to the present invention has been proved by the above-described embodiment, in which the focus position of an optical pickup PUi can be appropriately adjusted by measuring the brightness of a spot light image formed on the semitransparent film 6 of the half mirror 2 and fixing the multi-lens ML at a position when the brightness has become maximum.

Although the above-discussed embodiment is based on the focus position adjusting method of the present invention, this embodiment is also related to a focus position adjusting apparatus which is comprised of the brightness measuring apparatus 1 shown in FIG. 2, and a position adjusting mechanism having an actuator for changing the position of the multi-lens ML shown in FIG. 3 and FIG. 4. Actually, such focus position adjusting apparatus is used to adjust the focus position of each optical pickup PUi.

Namely, the focus position of an optical pickup PUi is adjusted by the above-described focus position adjusting apparatus. Actually, in adjusting the focus position of an optical pickup, the optical pickup PUi is operated to start a focus servo. Meanwhile, the position of the multi-lens ML provided in the optical pickup is changed continuously using the above-mentioned position adjusting mechanism. At this time, the signal processor 5 is operated to find a variation in the highest brightness of a spot light image incident on the half mirror 2 through the objective lens OB of the optical pickup PUi. Then, the position adjusting mechanism is operated to fix the multi-lens ML at a position when the highest brightness has become maximum, thereby effecting the adjustment of the focus position of the optical pickup PUi.

In this way, when the focus position adjusting apparatus comprising the brightness measuring apparatus 1 and the position adjusting mechanism is used to adjust the focus position of an optical pickup PUi, such an adjustment can be completed rapidly, thereby making it possible to realize an automated focus position adjustment.

Although in the present embodiment the position of the multi-lens ML is changed to perform the focus position adjustment, it is also allowed to change the positions of the semiconductor lasers LD or the position of the light-receiving element OEIC, fix the positions of the semiconductor lasers LD or the position of the light-receiving element OEIC when the highest brightness has become the maximum highest brightness.

While there has been described what are at present considered to be preferred embodiments of the present invention, it will be understood that various modifications may be made thereto, and it is intended that the appended claims cover all such modifications as fall within the true spirit and scope of the invention.

What is claimed is:

1. A method of adjusting the focus position of an optical pickup, said method comprising:
   a first step in which a brightness measuring apparatus including a half mirror and an objective lens focusing on the half mirror and also including a signal processor for finding a highest brightness of a light image entering through the half mirror and the objective lens is disposed to face an optical pickup; and
   a second step in which the optical pickup is operated to start a focus servo, the positions of semiconductor lasers provided in the optical pickup or relative positions of a multi-lens and a light-receiving element of the optical pickup are changed continuously, the signal processor is operated to find a change in the highest brightness of a spot light image incident on the half mirror through an objective lens provided in the optical pickup, said positions are fixed once the semiconductor lasers or the multi-lens and light-receiving element have been moved to positions when the highest brightness has become a maximum highest brightness, thereby effecting an adjustment of the focus position of the optical pickup.

2. The method according to claim 1, further comprising:
   a pretreatment in which a standard optical pickup is controlled so as to focus on the half mirror of the brightness measuring apparatus, relative positions of the objective lens and the half mirror provided in the brightness measuring apparatus are adjusted so as to obtain a highest brightness of a spot light image incident on the half mirror from the standard optical pickup, thereby rendering the objective lens to focus on the half mirror,
   wherein said first step is started after the pretreatment is performed to render the objective lens of the brightness measuring apparatus to focus on the half mirror.

3. The method according to claim 1 or 2, wherein the multi-lens consists of a focus correction lens formed by combining a cylindrical lens with a concave lens, and is disposed between the objective lens and a light-receiving element all located in the optical pickup, said light-receiving element being provided for receiving a reflected light returning back through the objective lens and for generating photo-electric-conversion signal for producing at least RF signal.

4. An apparatus for adjusting the focus position of an optical pickup, said apparatus comprising:
   a brightness measuring apparatus including a half mirror and an objective lens focusing on the half mirror and also including a signal processor for finding a highest brightness of a light image entering through the half mirror and the objective lens,
   wherein the optical pickup is operated to start a focus servo, the positions of semiconductor lasers provided in the optical pickup or relative positions of a multi-lens and a light-receiving element of the optical pickup are changed continuously, the signal processor is operated to find a change in the highest brightness of a spotlight image incident on the half mirror through an objective lens provided in the optical pickup,
   wherein said positions are fixed once the semiconductor lasers or the multi-lens and light-receiving element have been moved to positions when the highest brightness has become a maximum highest brightness, thereby effecting an adjustment of the focus position of the optical pickup.

* * * * *